United States Patent
Dong et al.

(10) Patent No.: US 11,436,691 B2
(45) Date of Patent: Sep. 6, 2022

(54) SYSTEMS AND METHODS OF MANAGING ENERGY COST OF A BUILDING

(71) Applicant: Board of Regents, The University of Texas System, Austin, TX (US)

(72) Inventors: Bing Dong, Helotes, TX (US); Amin Mirakhorli, San Antonio, TX (US); Jeff Qiang Xu, San Antonio, TX (US)

(73) Assignee: BOARD OF REGENTS, THE UNIVERSITY OF TEXAS SYSTEM, Austin, TX (US)

( * ) Notice: Subject to any disclaimer, the term of this patent is extended or adjusted under 35 U.S.C. 154(b) by 261 days.

(21) Appl. No.: 15/945,112

(22) Filed: Apr. 4, 2018

(65) Prior Publication Data
US 2018/0285989 A1    Oct. 4, 2018

Related U.S. Application Data

(60) Provisional application No. 62/481,238, filed on Apr. 4, 2017.

(51) Int. Cl.
| | | |
|---|---|---|
| *G06Q 50/06* | (2012.01) | |
| *G06Q 30/02* | (2012.01) | |
| *G06Q 10/06* | (2012.01) | |

(52) U.S. Cl.
CPC ....... *G06Q 50/06* (2013.01); *G06Q 10/06315* (2013.01); *G06Q 30/0206* (2013.01)

(58) Field of Classification Search
CPC .................................................... G06Q 50/06
See application file for complete search history.

(56) References Cited

U.S. PATENT DOCUMENTS

| | | | |
|---|---|---|---|
| 8,653,968 | B2 | 2/2014 | Brown et al. |
| 8,756,024 | B2 | 6/2014 | Hedley et al. |
| 2003/0009265 | A1 | 1/2003 | Edwin |
| 2005/0171645 | A1 | 8/2005 | Oswald et al. |
| 2011/0015798 | A1 | 1/2011 | Golden et al. |
| 2011/0046805 | A1 | 2/2011 | Bedros et al. |
| 2012/0066168 | A1* | 3/2012 | Fadell ............... G06N 20/00 706/52 |
| 2012/0323382 | A1* | 12/2012 | Kamel .............. G01R 21/133 700/286 |

(Continued)

FOREIGN PATENT DOCUMENTS

EP          1850440        10/2007

OTHER PUBLICATIONS

Albadi, M. H.; et al (2007). "Demand response in electricity markets: An overview." Paper presented at the 2007 IEEE power engineering society general meeting.

(Continued)

*Primary Examiner* — Kurtis Gills
(74) *Attorney, Agent, or Firm* — Thomas | Horstemeyer, LLP

(57) ABSTRACT

Measurements of energy usage including details of power consumption can be stored for power usage devices. The measurements of energy usage can be used to predict future consumption for each of the power usage devices. A power consumption can be modified using the prediction. The energy cost can be optimized based using the prediction, such as, for example, by modifying a power consumption of one of the power usage devices.

19 Claims, 12 Drawing Sheets

(56) References Cited

U.S. PATENT DOCUMENTS

| | | | |
|---|---|---|---|
| 2013/0304269 A1* | 11/2013 | Shiel | G06Q 50/06 700/291 |
| 2014/0214215 A1 | 7/2014 | Han et al. | |
| 2014/0277761 A1* | 9/2014 | Matsuoka | G05D 23/1904 700/276 |
| 2015/0057820 A1 | 2/2015 | Kefayati et al. | |
| 2015/0178865 A1* | 6/2015 | Anderson | G05B 17/02 705/7.25 |
| 2015/0198962 A1 | 7/2015 | Shiel | |
| 2016/0070332 A1* | 3/2016 | Viswanadham | G06F 1/3234 713/320 |
| 2016/0305678 A1* | 10/2016 | Pavlovski | F24F 11/62 |
| 2016/0370814 A1* | 12/2016 | Hanley | G05B 15/02 |

OTHER PUBLICATIONS

Bengea, S. C.; et al, (2014). "Implementation of model predictive control for an HVAC system in a midsize commercial building." HVAC&R Research, 20(1), 121-135.

Bozchalui, M. C.; et al (2012). "Optimal operation of residential energy hubs in smart grids." IEEE transactions on Smart Grid, 3(4), 1755-1766.

Dong, B., Li, Z.; et al (2015). "An investigation on energy-related occupancy behavior for low-income residential buildings." Science and Technology for the Built Environment, 21(6), 892-901.

Erol-Kantarci, M.; et al (2011). "Wireless sensor networks for cost-efficient residential energy management in the smart grid." IEEE transactions on Smart Grid, 2(2), 314-325.

Javaid, N.; et al (2013). "A survey of home energy management systems in future smart grid communications." Paper presented at the Broadband and Wireless Computing, Communication and Applications (BWCCA), 2013 Eighth International Conference on.

Li, Z.; et al (2016). "A Hierarchical Approach Using Machine Learning Methods in Solar Photovoltaic Energy Production Forecasting." Energies, 9(1), 55.

Mirakhorli, A.; et al (2016). "Occupancy behavior based model predictive control for building indoor climate—A critical review." Energy and Buildings, 129, 499-513.

Mohsenian-Rad, A.-H.; et al 2010). "Optimal residential load control with price prediction in real-time electricity pricing environments." IEEE transactions on Smart Grid, 1(2), 120-133.

Nguyen, D. T.; et al (2014). "Joint optimization of electric vehicle and home energy scheduling considering user comfort preference." IEEE transactions on Smart Grid, 5(1), 188-199.

Oldewurtel, F.; et al (2013). "Importance of occupancy information for building climate control." Applied energy, 101, 521-532.

Rotering, N.; et al (2011). "Optimal charge control of plug-in hybrid electric vehicles in deregulated electricity markets." IEEE Transactions on Power Systems, 26(3), 1021-1029.

Tindale, A. (1993). "Third-order lumped-parameter simulation method." Building Services Engineering Research and Technology, 14(3), 87-97.

Xi, X.; et al (2014). "Using price-based signals to control plug-in electric vehicle fleet charging." IEEE transactions on Smart Grid, 5(3), 1451-1464.

\* cited by examiner

SYSTEMS AND METHODS OF MANAGING ENERGY COST OF A BUILDING

CROSS-REFERENCE TO RELATED APPLICATIONS

This application claims the benefit of U.S. Provisional Application No. 62/481,238, filed Apr. 4, 2017, the entire contents of which is hereby incorporated herein by reference.

BACKGROUND

The current inelastic nature of the electricity market is bringing instability and load management difficulties to the grid. Producers and suppliers of electricity must provide electricity at any cost, and consumers of electricity barely change their consumption based on electricity price. Direct load control (DLC) and price based control are two main methods that can be used by utility companies to involve residential sector in demand side program. Direct load control is a contract between a utility company and a consumer that gives the utility company the ability to shut down some of the devices during high demand periods. Price-based programs encourage consumers to shift their consumption by offering variable rates. The direct load control can result in consumers' dissatisfaction and cannot be performed frequently. On the other hand, price based methods are less effective due to lack of a smart price based control.

SUMMARY

A decentralized control of major consumers and schedule flexible appliances is introduced for a residential building for cost efficiency and occupant comfort. An air conditioning (AC) unit, electric vehicle (EV), and water heater are modelled and controlled using model predictive control (MPC) considering people behavior to maintain occupants' comfort and respond to the Grid price signals. Occupancy profile, and use patterns are introduced to the MPC problem in its constraints and operation cost of each device is introduced as the objective of the optimization problem. Finally, a solution to the optimization problem was found using mixed integer linear programming. Additionally, delay flexible appliances usage pattern effect on achievable saving using flexible start time in different pricing schemas is studied. Simulation results show that, MPC with occupancy constraint can achieve 23% cost saving for AC unit, 13% for EV, and 29% for water heater compared to traditional on/off controllers in dynamic pricing schema.

These and other aspects, objects, features, and embodiments will become apparent to a person of ordinary skill in the art upon consideration of the following detailed description of illustrative embodiments exemplifying the best mode as presently perceived.

BRIEF DESCRIPTION OF THE DRAWINGS

For a more complete understanding of the embodiments and the advantages thereof, reference is now made to the following description, in conjunction with the accompanying figures briefly described as follows.

Figure 1:
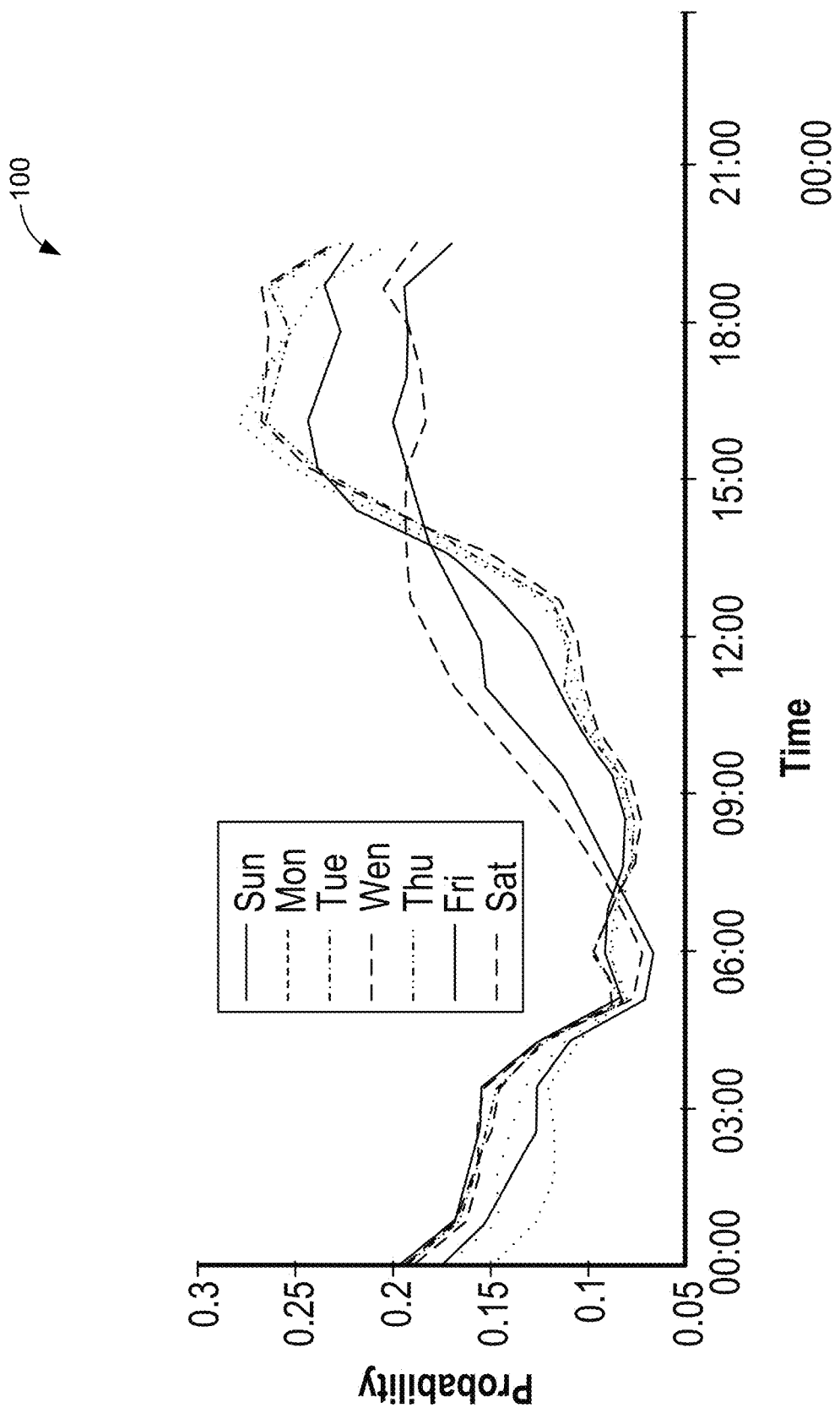
FIG. 1 illustrates a probability of a charger use electricity in homes over a two year span according to various example embodiments.
Figure 2:
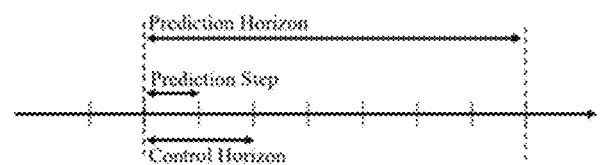
FIG. 2 illustrates a MPC prediction, step, and control horizons according to various example embodiments.

The drawings illustrate only example embodiments and are therefore not to be considered limiting of the scope described herein, as other equally effective embodiments are within the scope and spirit of this disclosure. The elements and features shown in the drawings are not necessarily drawn to scale, emphasis instead being placed upon clearly illustrating the principles of the embodiments. Additionally, certain dimensions may be exaggerated to help visually convey certain principles. In the drawings, similar reference numerals between figures designate like or corresponding, but not necessarily the same, elements.

DETAILED DESCRIPTION

In the following paragraphs, the embodiments are described in further detail by way of example with reference to the attached drawings. In the description, well known components, methods, and/or processing techniques are omitted or briefly described so as not to obscure the embodiments. As used herein, the "present invention" refers to any one of the embodiments of the invention described herein and any equivalents. Furthermore, reference to various feature(s) of the "present invention" is not to suggest that all embodiments must include the referenced feature(s).

Among embodiments, some aspects of the present invention are implemented by a computer program executed by one or more processors, as described and illustrated. As would be apparent to one having ordinary skill in the art, the present invention may be implemented, at least in part, by computer-readable instructions in various forms, and the present invention is not intended to be limiting to a particular set or sequence of instructions executed by the processor.

The embodiments described herein are not limited in application to the details set forth in the following description or illustrated in the drawings. The invention is capable of other embodiments and of being practiced or carried out in various ways. Also, the phraseology and terminology used herein is for the purpose of description and should not be regarded as limiting. The use of "including," "comprising," or "having" and variations thereof herein is meant to encompass the items listed thereafter, additional items, and equivalents thereof. The terms "connected" and "coupled" are used broadly and encompass both direct and indirect connections and couplings. In addition, the terms "connected" and "coupled" are not limited to electrical, physical, or mechanical connections or couplings. As used herein the terms "machine," "computer," "server," and "work station" are not limited to a device with a single processor, but may encompass multiple devices (e.g., computers) linked in a system, devices with multiple processors, special purpose devices, devices with various peripherals and input and output devices, software acting as a computer or server, and combinations of the above.

Turning now to the drawings, exemplary embodiments are described in detail. Occupant experience is the most important part of reducing energy usage. Appliance consumption and operation is highly related to the behavior of people in a building. Thermal comfort, ventilation rate, and thermal load can be directly related to occupant number in each thermal zone. Water heater peak energy consumption can be affected by the time that people take showers or use washing machines in their building. Electric vehicle charging pattern can be a function of arrival time of the people driving the vehicle.

People typically have the same routine use of their appliances, which can be used to schedule energy consumption of these devices. For instance: as shown in FIG. 1, most homes with an electric vehicle (EV) charger, charge their EV around 6:00 pm when they arrive home from work, and leave home around 7:00 am for work. This pattern on workdays can be used to automatically schedule charging time of the EV. However, this charging schedule should not cause people dissatisfaction. The graph 100 in FIG. 1 depicts the probability of the charger uses electricity in 104 homes from Pecan Street Inc. database over a period of approximately two years.

There are many studies trying to control individual appliances such as HVAC and EV based on electricity price. The present disclosure includes a price based residential building energy management by controlling major home appliances based on grid price signals, meanwhile considering appliance use patterns and occupancy profiles. The energy management system can connect occupant behavior, smart home devices, and smart grid through advanced simulation and controls that better manage home electricity usages.

Security, scalability, and intelligence of a home energy management system can be defined and current methods are studied in optimization and communication based groups. A rule-based scheduling method can be presented for home appliances, considering local available storages and electricity peak hours. This method can achieve close savings to be an optimization-based control. An optimization-based scheduling can also be introduced considering delay flexible appliances and cost of waiting time for scheduling in a dynamic pricing with price predictor. A coupled control of EV and HVAC can be introduced to minimize electricity consumption cost.

A model predictive control (MPC) can be designed to utilize an EV battery to shift building load to the periods with lower electricity price. Managing multiple buildings to use available EV batteries can result in more savings. Mixed integer linear programming can be used to achieve an optimal operation of appliances including: Air Conditioning (AC), EV, water heater, washers, stove, lightings, pool pump and batteries. Time of Use (TOU), hourly price, and fixed price scenarios with different objectives such as: cost, energy, peak load, total consumption and comfort are simulated, and simulation results show the capabilities of MPC in achieving an optimal operation in smart home energy management.

A smart home energy management system can use MPC, occupancy profile, and device usage patterns and probabilities to optimize energy usage. AC, EV, a water heater, a laundry machine, and a dishwasher can be optimally controlled in time of use pricing, day ahead hourly pricing, and real time five minutes pricing. A behavior pattern for people can be extracted from smart meter data to MPC price-based control for a smarter control.

A goal of the model predictive control can be to minimize total bill while considering operation limits. Model predictive control can be used to obtain an optimal control method that calculates the optimal control action by predicting future states of the system using system model and disturbances predictions. The optimization problem can be solved for prediction horizon in every control step. In building applications, prediction horizon can vary from one hour to one day, and prediction steps can vary from five minutes to one hour. However, control horizon can be considered to be the same as prediction step size. A linear form MPC can be used in building control, and mathematical programing methods can be used to solve such a linear problem. In more complex applications, such as building HVAC control, where there are several nonlinearities, genetic algorithm can be used to solve the nonlinear MPC problem. The nonlinear MPC problem can be linearized to avoid local optimal solutions and computational complexities. However, linearized problem results in less accuracy. This is a trade-off between using a more accurate model or a more accurate mathematical solution.

Five-minutes intervals can be used for the prediction step and control horizon. The optimization problems can be solved for one hour ahead in AC and water heater control, and five hours for EV charger control. Longer prediction horizons can provide the MPC with the ability to see farther events and make decision ahead of time. However, capabilities of the controlled system on shifting its consumption or predicting future states accurately should be considered to design this prediction horizon. High nonlinearity of thermal behavior of the building, stochastic nature of influencing disturbances, including: solar radiation, occupant behavior, internal gain, and ambient temperature decrease long predictions accuracy. For this reason, AC unit have a one hour prediction horizon. On the other hand, predictability of the state of charge for an EV battery and small disturbances will make this prediction accurate. Beside a high accuracy of an EV State of Charge (SOC) model, this device can effectively shift its charging consumption. The only limit on shifting EV consumption is the limited available time to charge the battery. For this reason, a five-hour prediction horizon is considered for this device. The prediction horizon for a water heater is one hour corresponding to maximum allowed shifting time. However, this shifting time is a design parameter which can be chosen by the user.

The following formulation represents MPC formulation in general form:

$$\min \sum_{t=1}^{m} p_t u_t + \omega s_t \quad (1)$$

Subject to:

$$LB - s_t < x^{n+1} < UB + s_t$$

$$x^{n+1} = Ax^n + Bu$$

$$u_t \in U \quad s_t \in \mathbb{R}_{20}$$

$p_i$ Price of Electricity at step $i$ $u_i$ System input $\omega$ Penalty weight for slack variable $s_t$ Slack variable $x^n$ System States $LB$ Lower bound on system state $UB$ Upper bound on system state $m$ Prediction Horizon In this formula $x^n$ is the state of the system, A and B are system characteristic matrices, $p_i$, is price at each step, and $u_i$ is system input. In this formulation $s_i$ is designed as a slack variable to prevent the problem to go infeasible, by relaxing the constraints. LB and UB are the lower bound and the upper bound on the system. These bounds can be designed based on the system characteristics and usage profile.

A goal of a fully connected and smart grid can be to involve all parties in an interactive market, where consumers of electricity negotiate for the price of electricity. One underlying aspect of the interactive market in that consumers of electricity can be charged a dynamic electricity price. A real time dynamic price is the true signal, representing the real cost of electricity, which can be used to change consumer's behavior at each location. Currently, a small portion of residential buildings in United States are charged a dynamic electricity price. For instance: Power Smart Pricing from Ameren Illinois, ComEd real time pricing, and California time of use pricing are examples of dynamic electricity pricing. However, the real cost of electricity can change every five minutes and can be highly dynamic.

Figure 3:
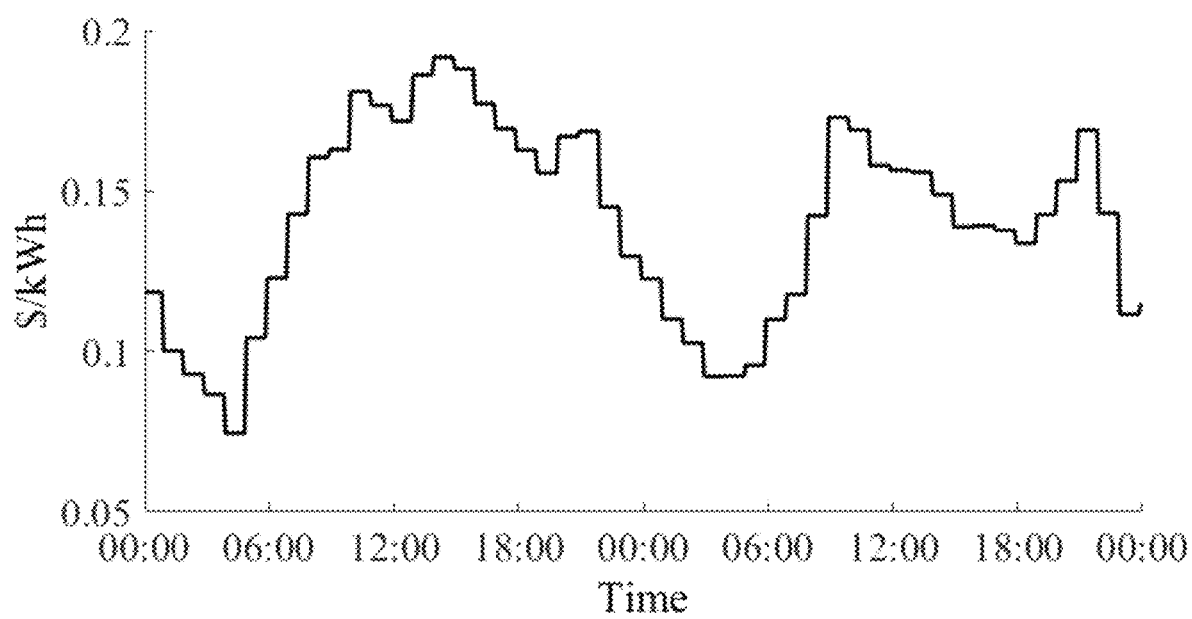
FIG. 3 illustrates an example of scaled day ahead hourly pricing according to various example embodiments.
Figure 4:
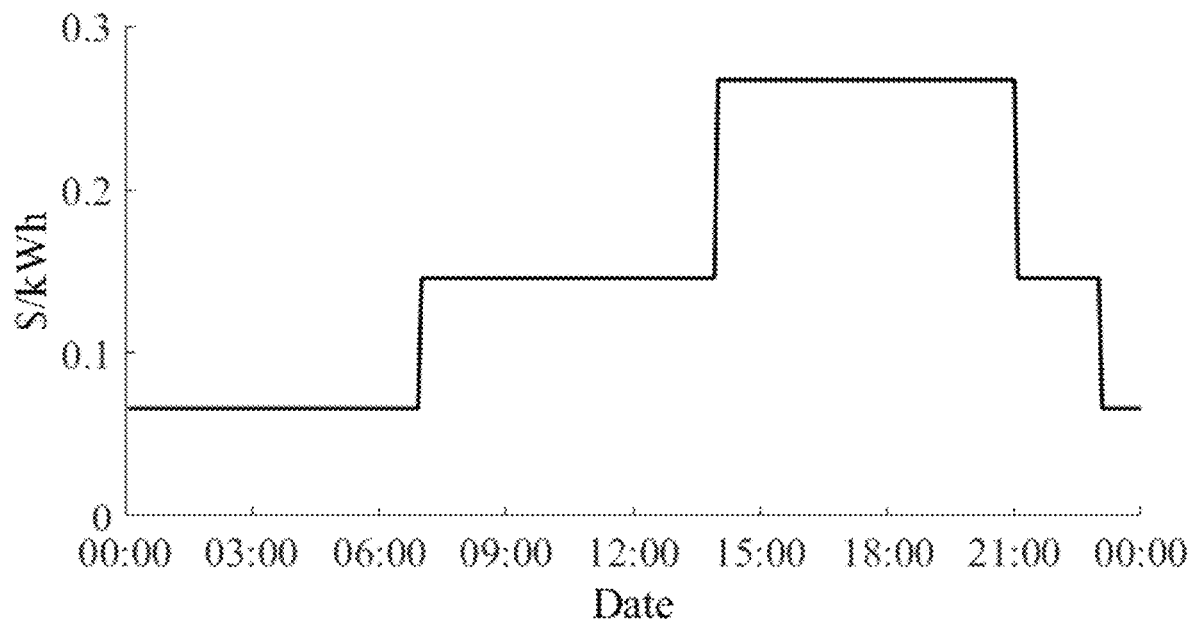
FIG. 4 illustrates an example of a scaled time of use electricity price according to various example embodiments.

In some embodiments, three different pricing schemas can be used in the MPC objective function, including: time of use, real time, and day ahead pricing. In time of use pricing, each day is divided in two or three periods, where the price changes regarding peak and off-peak hours. In California time of use pricing, electricity rate changes in three periods of, high peak, mid peak, and low peak, where the demand is high, average, and low. FIG. 4 depicts scaled California TOU pricing. On the other hand, hourly price changes in each hour of the day (FIG. 3), and real time five-minutes price changes dynamically every five minutes. All prices used can be scaled to have an average of 14 cent/kWh for comparison purposes.

Building thermal mass can be used to shift AC energy consumption. The amount of consumption shift depends on the rate of indoor temperature change and a thermostat control deadband. High thermal mass will result in a lower rate in temperature change and larger energy storage. On the other hand, larger temperature deadband will result in a more relaxed constraint on the optimization problem.

AC unit modelling and control can involve building thermal behavior and AC modeling. Building thermal behavior can be modeled using resistance capacitor network models. This thermal network can represent building energy balance, which can be formulated in 1R, 2R1C, and 3R2C circuits. Increasing the number of capacitors for wall modelling more than two does not change simulation results significantly. In this model, walls can be modeled as a 3R2C model, windows can be modeled as a single resistance, and building mass can be modeled as a large capacitor to store energy.

$$C_{11}\dot{T}_1 = -\left(\frac{1}{R_{12}} + \frac{1}{R_{13}} + \frac{1}{R_{14}} + \frac{1}{R_{15}}\right) \times \quad (2)$$
$$T_1 + \frac{T_{12}}{R_{12}} + \frac{T_{13}}{R_{13}} + \frac{T_{14}}{R_{14}} + \frac{T_{15}}{R_{15}} + Q_1 + \Delta H_1$$

$$C_{12}\dot{T}_{12} = -\left(\frac{1}{R_{12}} + \frac{1}{R_{12mtd}}\right) \times T_{12} + \frac{T_{21}}{R_{12mtd}} + \frac{T_1}{R_{12}}$$

$$C_{21}\dot{T}_{21} = -\left(\frac{1}{R_{21}} + \frac{1}{R_{12mtd}}\right) \times T_n + \frac{T_{12}}{R_{12mtd}} + \frac{T_2}{R_{21}}$$

Figure 5:
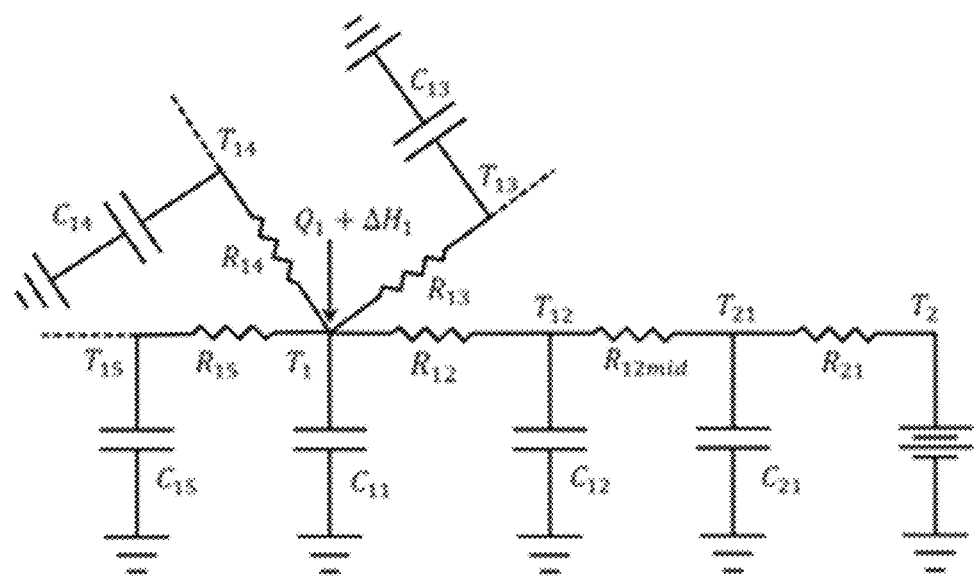
FIG. 5 illustrates an RC network model according to various example embodiments.

With reference to FIG. 5, shown is part of a one zone building 3R2C model with 4 walls according to various embodiments of the present disclosure. $Q_1+\Delta H_1$ is the total thermal energy input to the zone including: internal thermal gain, solar through the window, AC thermal load, and infiltration. R and C values are chosen based on the material and geometry of walls, and total energy consumption of the model. The values were validated with real measurements of a small residential building in San Antonio.

To control AC ON/OFF sequence, model predictive control can be formulated to minimize energy cost while keeping the temperature in a designed range. In other words, MPC can minimize an AC energy bill while keeping indoor temperature in the designed range. In one example, this temperature range can be within 0.7° C. from the set point. In order to achieve a more efficient control, disturbances prediction including solar radiation and outside temperature should be used in the MPC problem.

The occupant presence pattern can be used to save energy during unoccupied periods in buildings, which can achieve about 30% energy savings. The occupant pattern can be introduced to the constraint of the MPC problem. In one embodiment, a control temperature deadband can be relaxed by total of five degree Celsius in unoccupied periods. This temperature relaxation can have a large effect on savings and consumption shifting capabilities. In order to achieve higher shifting capabilities, a predictive mean vote (PMV) method can be used to define a larger deadband and relax even larger on unoccupied periods. However, when choosing this deadband, temperature set points and amount of relaxations is a design parameter that depends on the user. The smallest deadband and relaxation can be chosen to test capabilities of the proposed controller.

In order to separate the model predictive controller from the system model, a linear system identification can be performed in each step of control using previous inputs and outputs. In this system identification, a linear relation between indoor temperature changes and solar radiation, AC thermal load, Indoor and outdoor temperature difference and internal gain can be estimated using linear regression. $G_1$, $G_2$, $G_3$, and $G_4$ are the variables that can be estimated representing the effect of each of the thermal loads on the indoor temperature. Twenty steps of previous data can be used for this estimation. Simulation results shows that estimated next step temperature error from the actual next step temperature can be within 0.1° C.

MPC can be formulated to minimize cost of AC electricity consumption. Temperature is constrained within the deadband which is relaxed during the unoccupied periods. In order to avoid infeasibility in the linear programming problem, for each temperature constraint a slack variable can be defined which can relax these constraints with a weighted cost in the objective. This cost weight for slack variables can be chosen to increase the total cost with $5 for every Celsius degree it is relaxing the temperature bands. The following formulation is MPC problem for AC control:

$$\text{minimize} \sum_{t=1}^{m} p_t x_t + \omega s_t \quad (3)$$

Subject to:

$LB - k \times OC_t - s_t < T_{in}^{t+1} < UB + k \times OC_t + s_t$ $T_{in}^{t+1} = T_{in}^t + (x_t Q_{AC}) \times G_1 + (T_{out}^t - T_{in}^t) \times G_2 + (Q_{solar}) \times G_3 + G_4$ $x_t \in \{0, 1\} \quad s_t \in \mathbb{R}_{20}$ $p_i$ Price of Electricity at step $i$ $x_i$ Decision variable (AC ON:1, AC OFF:0)

$\omega$ Penalty weight for slack variable $s_t$ Slack variable to relax temperature constraints $T_{in}^t$ Indoor temperature at step $i$ $T_{out}^t$ Outdoor temperature at step $i$ LB Lower bound on system state UB Upper bound on system state $OC_t$ Occupancy at step$_i$ (Occupied: 0, Unoccupied: 1)

$k$ Unoccupied temperature relaxation gain $m$ Prediction Horizon $G_1$, $G_2$, $G_3$, and $G_4$ Estimated Gains $Q_{AC}$ AC thermal load $Q_{solar}$ Solar radiation Four controllers can be developed and compared:
Switching controller: This controller can turn ON and OFF the AC considering upper and lower limits from the set point.
Switching controller with occupancy feedback: This controller can have the same logic as switching controller. However, it can change the set-point to 23° C. (winter) or 27° C. (summer) when the room is not occupied.
MPC: This controller can use a building model and energy price predictions to minimize AC electricity bill.
MPC with occupancy predictions: This MPC controller can have a different temperature constraint than number 3. In this configuration temperature constraint can be relaxed to vary between 23° C. and 27° C. when the room is not occupied.

Simulation results for one day in real time five minutes pricing showed a saving of 19.5% just by using an MPC controller with a switching controller. This saving will increase to 23.7% by introducing occupancy profile to the problem to relax constraints on the optimization problem.

Figure 6:
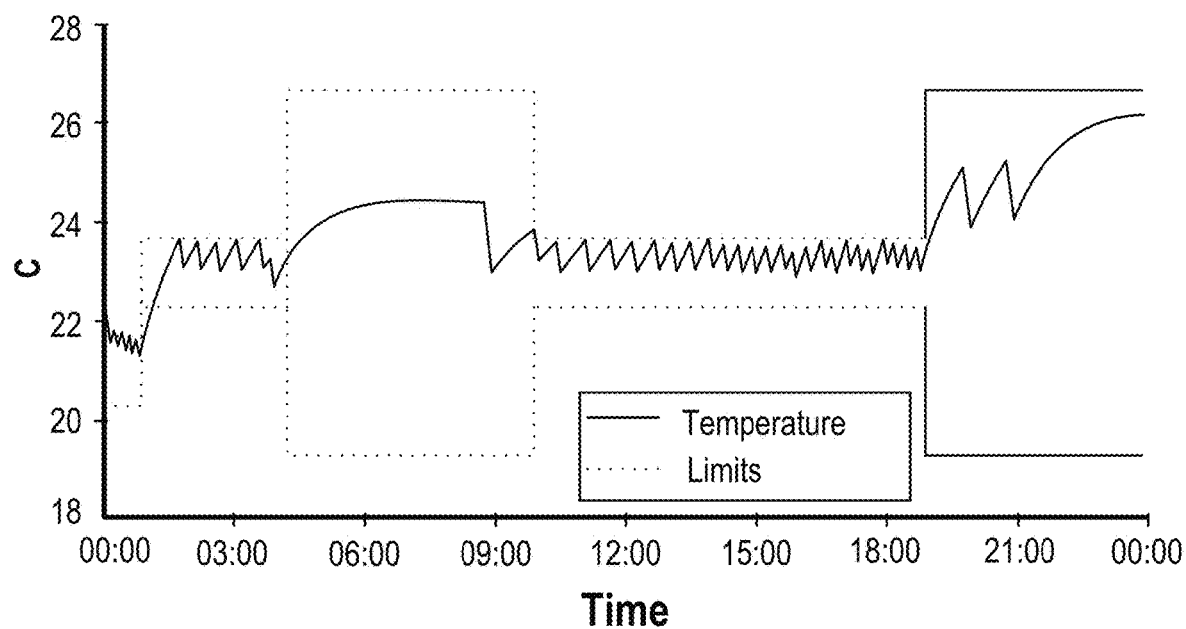
FIG. 6 illustrates indoor temperature with MPC controller and occupancy profile according to various example embodiments.

With reference to FIG. 6, shown is indoor temperature for an MPC with an occupancy controller. The MPC can try to keep the temperature while the AC uses the least energy with respect to constraints. The following table summarizes an example of savings achieved using different control algorithms.

TABLE 1

| | AC Savings | | |
|---|---|---|---|
| Controller | Monthly Consumption (kWh) | Monthly Bill ($) | Saving (%) |
| Traditional ON/OFF Controller | 397 | 55.5 | — |
| ON/OFF controller with Occupancy feedback | 358 | 50.1 | 9.7 |
| Real time pricing MPC with occupancy | 367 | 42.3 | 23.7 |
| Hourly Day ahead pricing MPC with occupancy | 365 | 46 | 17.1 |
| TOU pricing MPC with occupancy | 364 | 48.2 | 13.1 |

EV battery can be utilized for peak shaving in large and small scales. However, currently the cost of replacing an EV battery can consume a large portion of savings achieved with these methods. For instance: replacing cost of $312/kWh for battery and a battery life of 7500 cycles, electricity load shifting cost would be 4.2 cents/kWh. The mean cost of electricity is about 14 cents/kWh in residential sector. This big battery degradation cost will reduce a big portion of cost savings. However, this battery degradation highly depends on the SOC operation window and the kind of the battery chemistry and foreign factor. A type of smart EV charging is designed herein that does not charge and discharge the battery in an uncontrolled way.

To shift EV charging time, an EV use pattern can be considered. Two years of behaviour of an EV charging in a residential building can be used to find the probability of the EV to stay connected to the charger. Then the departure time can be estimated using EV charger energy consumption data. Next, the probability of the EV leaving the house can be used to design a lower bound on the state of charge in each time step. In one example, in order to study EV charging pattern, smart meter data from Pecan Street Inc. database for EV charger hourly consumption can be used. EV charger starts using electricity when the EV connects to the charger. The EV can use a total amount of energy equal to the amount of energy used in driving and can stop charging whenever the battery is fully charged. For simulation purposes, initial SOC when the EV is connected to the charger and the starting time of charging can be extracted from this data. However, this data does not represent any departure time. In order to estimate a departure time, a probability of the EV being charged in each hour of the day can be used. An average connection time ($t_i^{con}$) of four hours can be assumed. Based on the following logic, the probability of the EV departure can increase by weighted probability of the charger uses electricity based on the historical data.

For $j = 1$ to $j_{max} = (t_i^{con})/dt$

-continued $$P(EV \text{ stay Connected until } j+t) = 1 - \frac{1}{j_{max}} \sum_{1}^{j} \left(1 - \frac{P_{j+t}^{use}}{P_{max}^{use}}\right)$$

IF $rand(n) < P(j+t)$:

$t_d = \text{Time}(i+j)$

IF no $t_a$ found:

$t_d = \text{Time}(j_{max})$ $t_i^{con} = $ Mean Connection time at $i$ $P_t^{use} = $ Probability of charger be in use $P_{max}^{use} = $ Maximum Probability of $P^{use}$ $t_d = $ Selected Departure time $dt = $ MPC Time Step This departure time calculation can be useful when only smart meter data or charger energy consumption is available. A better estimation would be using cumulative probability of the departure from a connection time. The mentioned algorithm can find a charging time shorter than the mean connection time from the historical data based on the probability of the EV being connected to the charger. However, if this calculated time is shorter than the amount of time needed by the battery to be fully charged, the charging duration will be equal to the minimum feasible time to fully charge the battery. This departure time calculation will give the charging scheduling problem a flexibility to shift its consumption. To find the optimal sequences to charge the battery, an optimization problem can be solved considering the model of the EV battery in each step to find the best charging period. The following formulation shows the MPC problem can be solved in every five minutes:

$$\min \sum_{t=1}^{m} p_t x_t + \omega s_t \quad (3)$$

Figure 7:
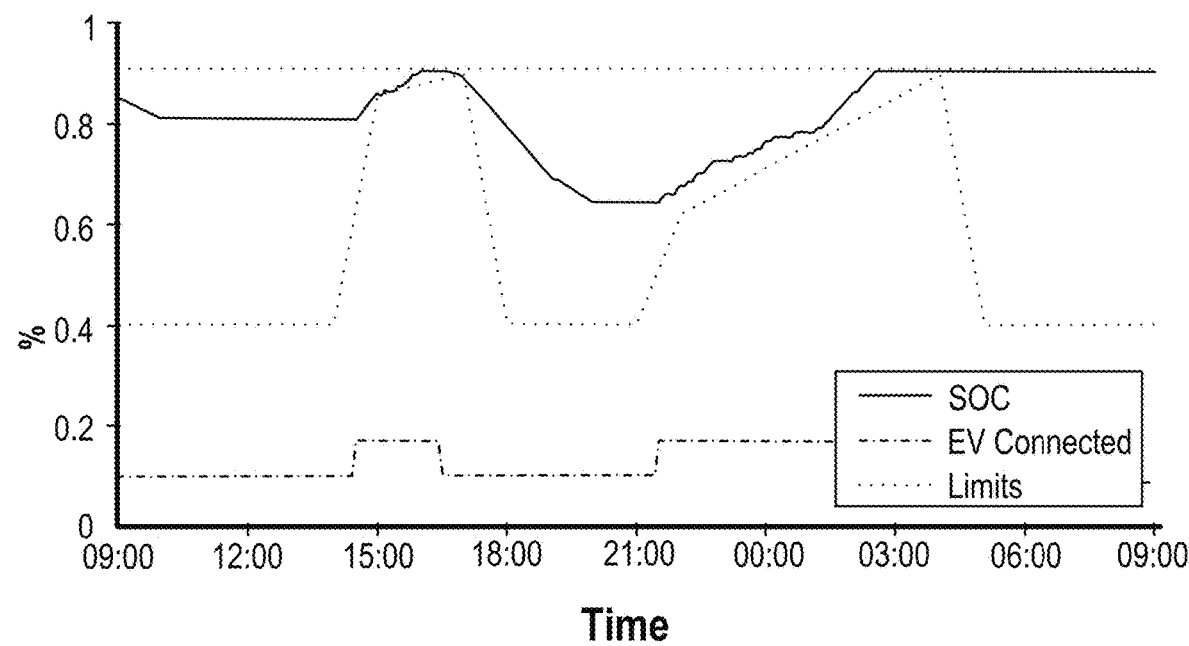
FIG. 7 illustrates an electric vehicle state of charge in real time five minute pricing with MPC according to various example embodiments.

Subject to:

$SOC_{LB}^{t+1} - s_t < SOC^{t+1} < SOC_{UB}^{t+1} + s_t$ $SOC^{t+1} = SOC^t + \frac{V_b I_b}{Q} = \frac{1}{Q}(\eta_o P_c x_t - \eta_d P_d)$ $x_t \in \{0, 1\} \quad s_t \in \mathbb{R}_{20}$ $p_i$ Price of Electricity at step $i$ $x_i$ Decision variable $\omega$ Penalty weight for slack variable $s_t$ Slack variable $SOC^t$ Battery State of charge $SOC_{LB}^{t+1}$ Lower bound on Battery State of charge $SOC_{UB}^{t+1}$ Upper bound on Battery State of charge $v_b$ Charging voltage $I_b$ Charging current $Q$ Battery capacity $\eta_o \eta_d$ Charging and discharging efficiency $P_c P_d$ Charging and discharging power In one example, a Nissan Leaf with 30 kWh battery is modelled, as shown below. Two control methods were developed and compared: First, an unscheduled charging, where the EV is charged whenever it is available for charging. Second, a scheduled charging using SOC lower bound designed using departure probability and electricity price. The FIG. 7 depicts a graph of the SOC, lower and upper bounds, and EV connectivity. Simulation results for one year using one residential building smart meter data shows that MPC can achieve 13% cost saving using a real time electricity pricing schema over unscheduled charging, and 10% savings using a TOU pricing schema.

Figure 8:
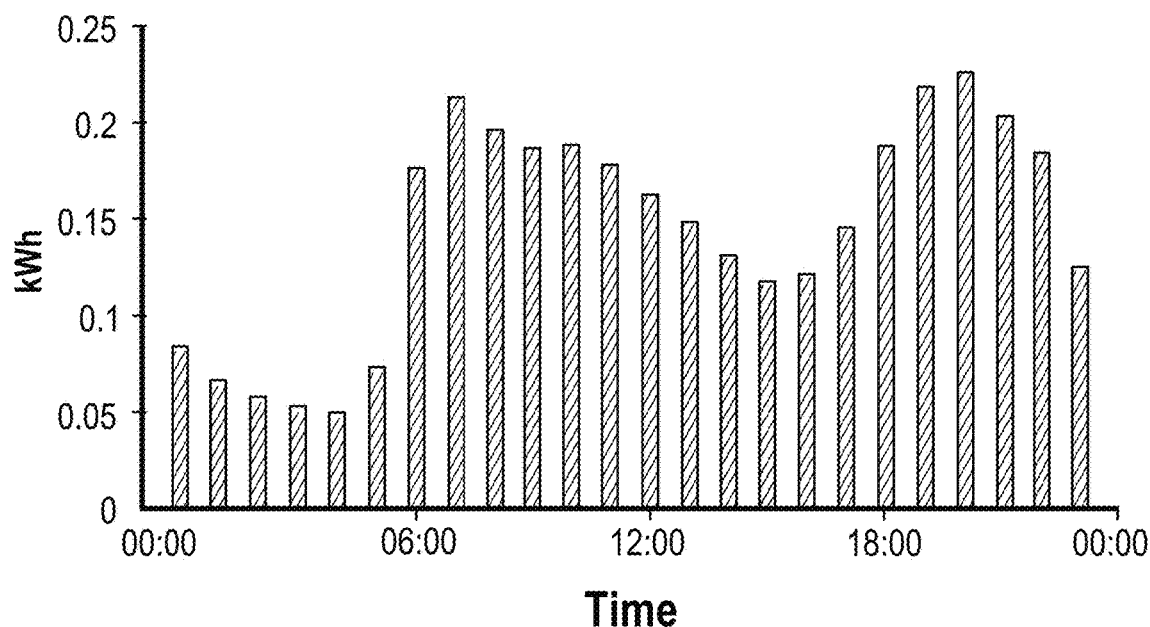
FIG. 8 illustrates water heater average energy consumption for homes according to various example embodiments.

Water heaters with hot water storage tanks can provide a large thermal storage, which can be used to shift this device energy consumption. However, a usage pattern is needed to control this device more efficiently to avoid violating user expectations. For this purpose, in one example, three years of water heater energy use was used for one residential building. The three-years' data was used to find a probability of the water heater use electricity in each hour of the day and a mean value of the energy it uses in each hour of the day. These two features highly depend on the time that people take shower, and have two peaks at 7:00 AM and 8:00 PM based on 122 homes average water heater consumption. FIG. 8 shows average hourly energy use in water heater using 122 homes smart meter data.

A water heater has a simpler model and thermal behavior compared to most other appliances in building. This unit can be modelled using linear energy balance methods. Two approaches to model water heater behavior are discussed: one-node model and two-node model. One-node model is a physics-based model which assumes that the whole tank has a uniform temperature, and uses energy balance method to formulate its behavior.

$$MC\dot{T} = Q - rhC(T - T_{in}) - K(T - T_{amb}) \quad (2)$$

A model predictive control can be designed to minimize operation cost of water heater. In one embodiment, the MPC can be solved for one hour prediction horizon in every five minutes using mixed integer linear programming. To prevent problem infeasibility, slack variables can be used to relax constraint on the set points with large penalty in the objective function. The main problem is to design the lower bound on the temperature of the hot water. This lower bound can be designed using probability of the water heater to be used in the next hour and the amount of water being used. This data can be extracted from the historical data of the house. The lower bound can be designed to keep the minimum temperature of 40° C. at any condition. The lower bound starts from the current temperature of the water heater and increases with a rate equal to the mean energy use at that step. In other words, the lower bound increases with a rate to meet the mean energy use at each step and prevent the temperature to go blow a designed value. This rate is equal to mean energy use of water heater if water heater is used in each hour of the day.

Figure 9:
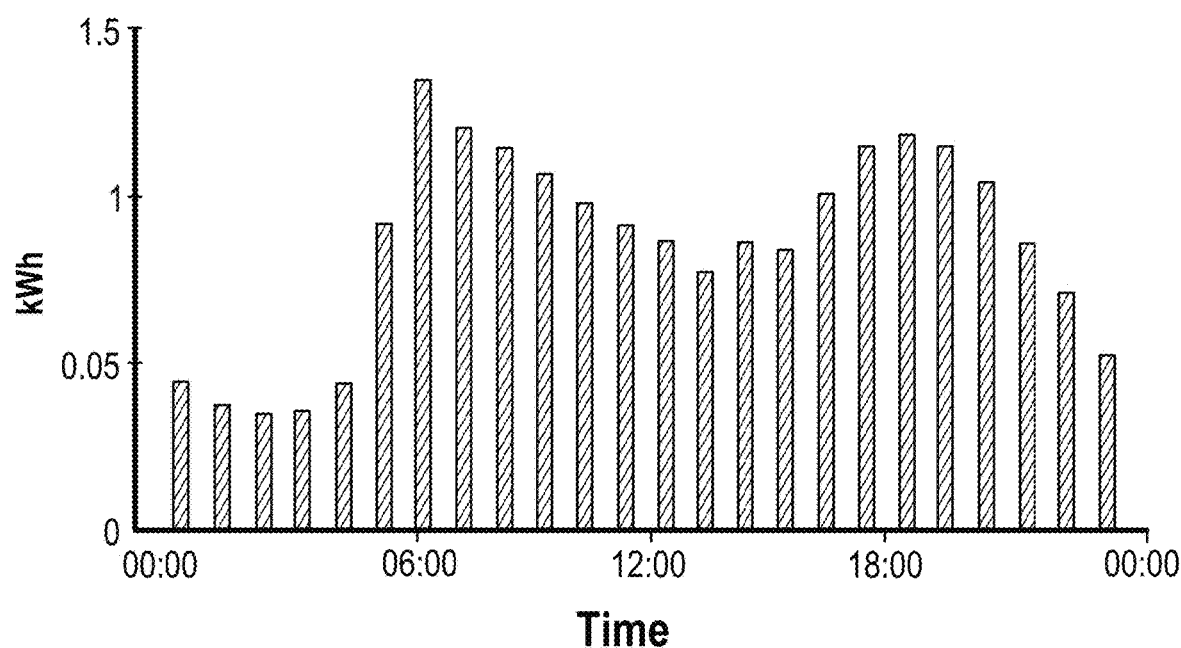
FIG. 9 illustrates average water heater energy use if the water heater starts using electricity in each hour of a day according to various example embodiments.

With reference to FIG. 9, shown the mean energy use of water heater if the device starts using electricity in each hour of the day for 122 homes according to various embodiments of the present disclosure. For simulation purposes, one home average water heater energy use can be used to find the rate of lower bound increase after 40° C.

Figure 10:
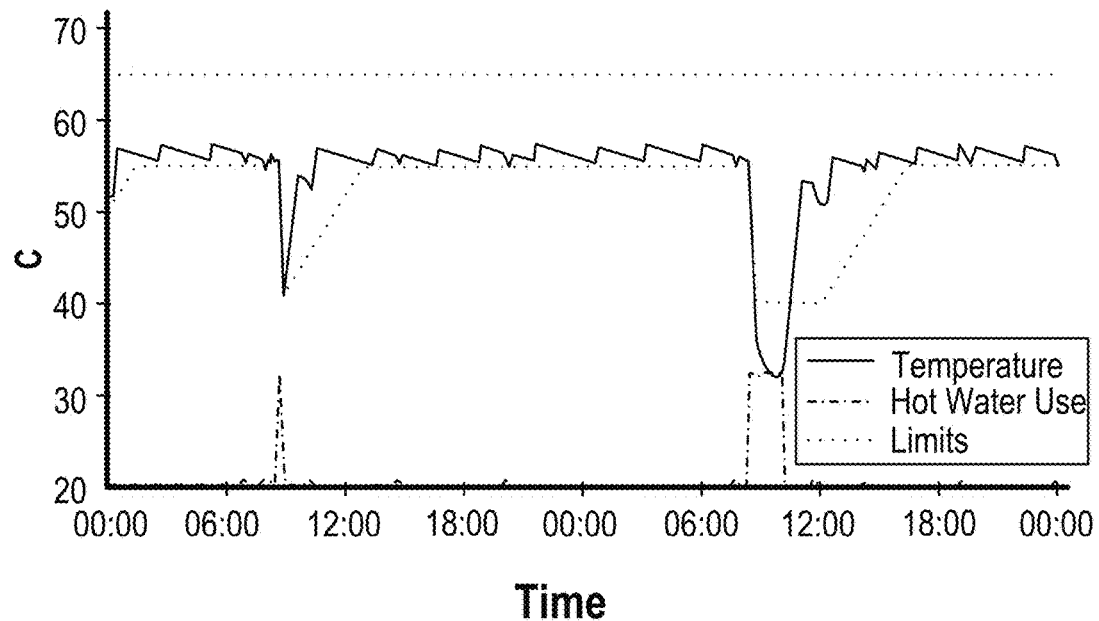
FIG. 10 illustrates water temperature in real time five minutes dynamic pricing with MPC according to various example embodiments.

With reference to FIG. 10, shown is a two-day simulation for water heater using pattern based MPC control according to various embodiments of the present disclosure. In the graph of FIG. 10, two major hot water uses happened in the morning the lower bound increases with the rate of previous average uses if the water heater was in use. One year simulation results using a dynamic real time five minutes pricing schema show that water heater with the MPC can achieve 29% cost saving.

Figure 11:
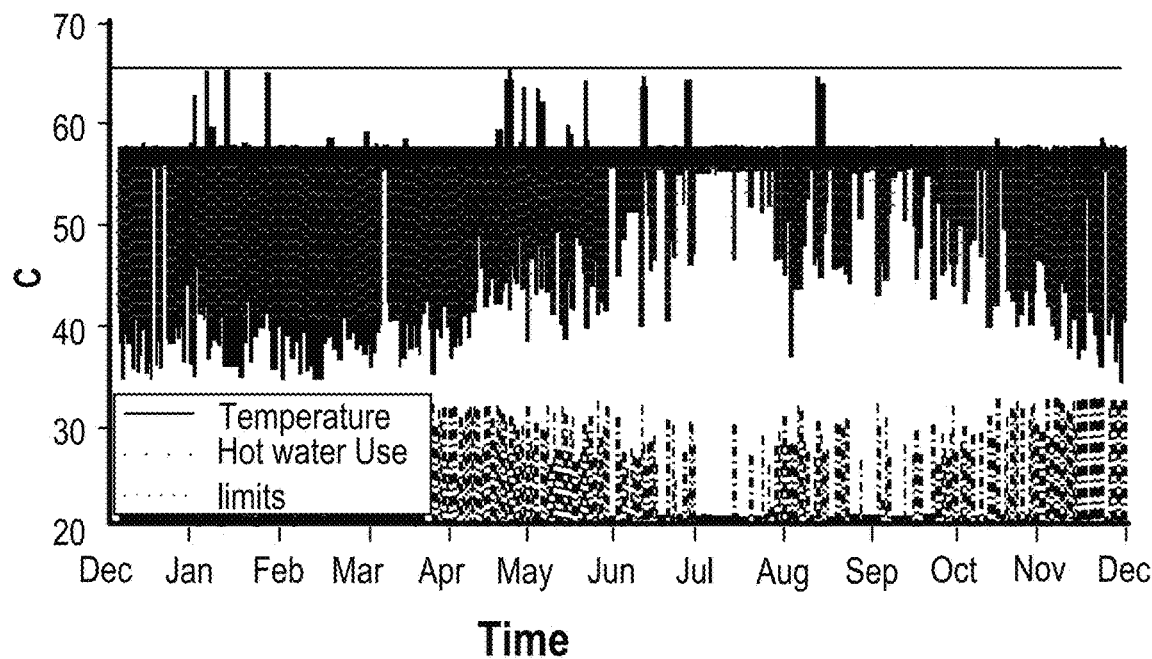
FIG. 11 illustrates one year of simulation results in real time five minute pricing according to various example embodiments.

With reference to FIG. 11, shown is a graph of one year simulation result for water heater hot water temperature using a dynamic real time five minutes pricing schema with MPC. FIG. 11 shows two interesting points:

The MPC tries to keep the hot water temperature close to the lower bound.

The MPC was able to avoid peak prices.

Figure 12:
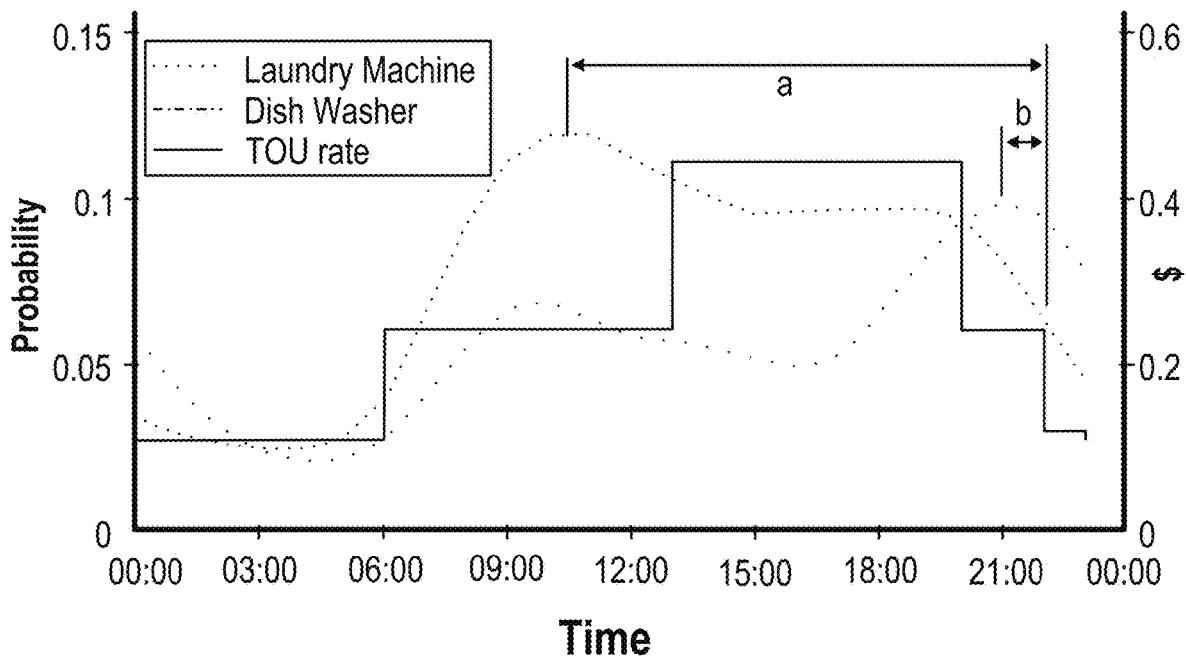
FIG. 12 illustrates a probability of a dishwasher (orange) and washing machine (blue) use electricity according to various example embodiments.

Delay flexible appliances can be the appliances that can shift some portion or all of their task to a later time. Washers are one of the main delay flexible appliances, which their start time or sequence of their tasks can be changed. However, a limited operation time should be defined to confidently shift their consumption time. Patterns of using washing machines and dishwashers can be used to estimate the amount of saving achievable if a one hour allowed shifting window. As an example, based on 514 homes smart meter data from Pecan Street Inc. database, people use their dishwasher mostly at 9:00 PM, which is one hour before the electricity price drops in TOU pricing schema (see, e.g., b in FIG. 12). However, people use laundry machine mostly at 10 AM when it is far away from any price drop in TOU pricing (see, e.g., a in FIG. 12). These results indicate there are more saving opportunities for dishwashers in TOU pricing compared to laundry machine if a start time scheduler is used.

For simulation purposes, one house laundry machine and dishwasher hourly consumption data is used to calculate the cost of electricity consumption of these two devices in a flexible start time and not flexible start time scenarios. In flexible start time, a cost of operation can be calculated based on the future steps (from 1 hour to 24 hours) electricity rate with different start times. The most efficient start time can be chosen as the new start time for cost calculation. The amount of savings can change in different pricing schemas and allowed time shifting. Simulation results using one year consumption pattern for one residential building show that a laundry machine with one hour flexible start time using a real time five-minute pricing schema can save 22% on its consumption cost and dishwasher can save 18% in the same scenario. The dishwasher can achieve 11% savings in TOU pricing with one hour flexible start time and laundry machine can only save 6% in the same scenario. This saving can change in these two devices for the same scenario based on the pattern of usage and people's behavior. The graphs of FIGS. 13 and 14 show the saving amount in different pricing schemas and different start time flexibility for laundry machine and the dishwasher.

Figure 13:
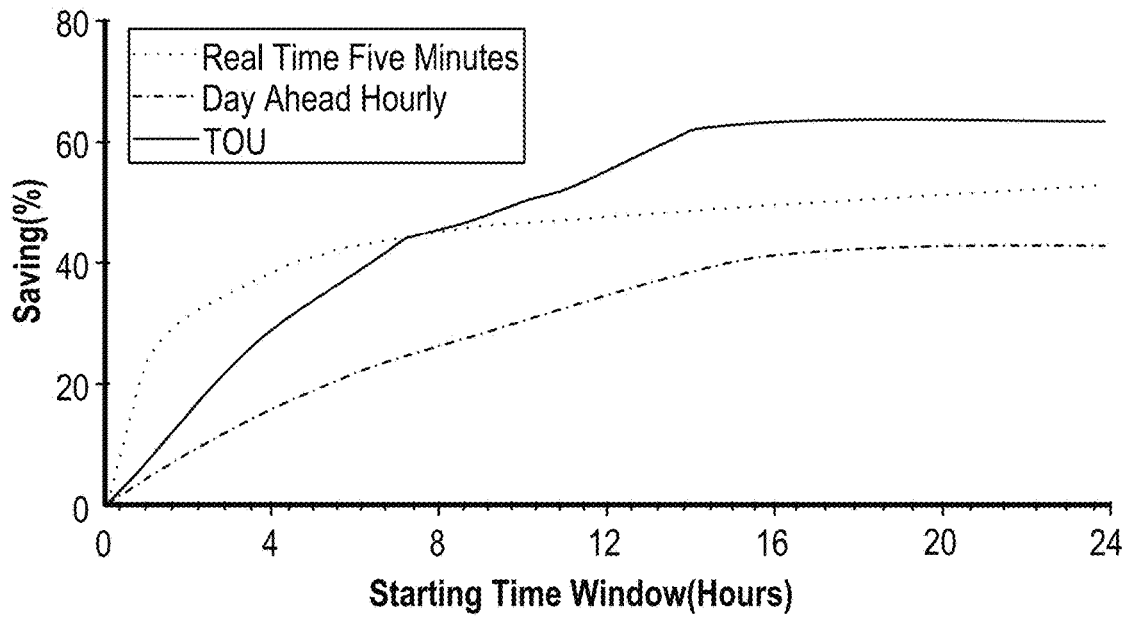
FIG. 13 illustrates laundry machine cost saving in different pricing schemas with different starting windows according to various example embodiments.
Figure 14:
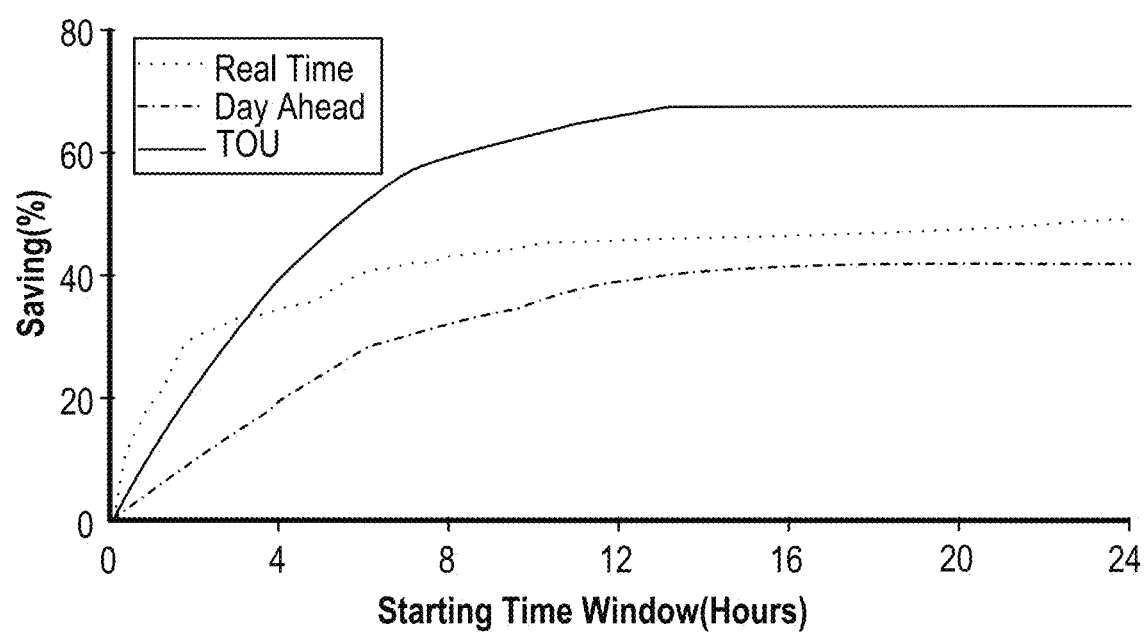
FIG. 14 illustrates dishwasher cost saving in different pricing schemas with different starting windows according to various example embodiments.

FIGS. 13 and 14 show that dishwasher use patterns can affect the amount of saving achievable using flexible start time scheduling compared to laundry machine. These graphs show that dishwashers can benefit from a flexible start time in TOU pricing more effectively when compared to washing machine. On the other side, the washing machine can respond to real time pricing schemas better when compared to dishwasher. Hourly day ahead pricing was not as effective as other pricing schemas. Rather, real time pricing results in larger savings.

Main controllable appliances in a residential building can be controlled using MPC, occupancy pattern, and usage patterns. An AC unit can be controlled considering occupants profile. EV charging problem can be solved using EV use patterns. The water heater can be controlled using a hot water use profile. Accounting people behaviour and considering their needs in controlling these devices can achieve a higher flexibility in shifting their consumption, and more savings.

Building and grid integration can be achieved by controlling appliances in a building with dynamic electricity pricing without violating occupant comfort. The model predictive controller can utilize building and water heater thermal storage and battery electricity storage to reduce electricity cost and respond to the grid signals. Among pricing schemas, dynamic real time pricing can achieve the highest energy savings opportunities and the highest awareness of grid needs.

Figure 15:
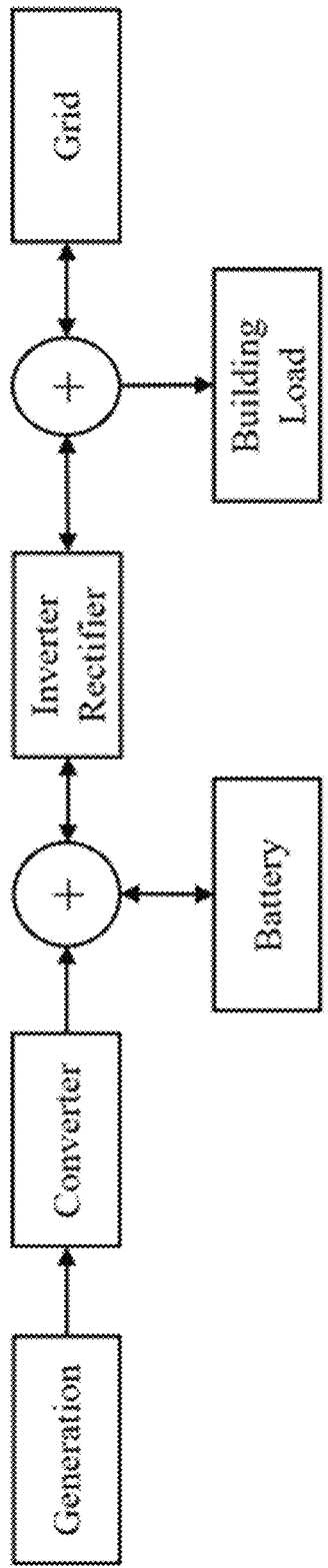
FIG. 15 illustrates the power flow and connection among different electrical components and energy devices according to various example embodiments.

With respect to one example scenario (Scenario 1), a Battery Energy Storage System (BESS), a standalone Model Predictive Control (MPC), and an Energy Management System (EMS) can be used to optimize power cost according to various embodiments of the present disclosure. The BESS and MPC can use a battery state of charge linear model, photovoltaic (PV) generation prediction, building load prediction, and electricity rate from grid to charge and discharge the BESS. An optimal controller can find the most cost efficient control action or strategy for the battery. The total electricity bill can be decreased by using the BESS to shift building energy consumption from high peak price periods to low price periods. FIG. 15 shows the power flow and connection among different electrical components and energy devices of this control system.

Figure 16:
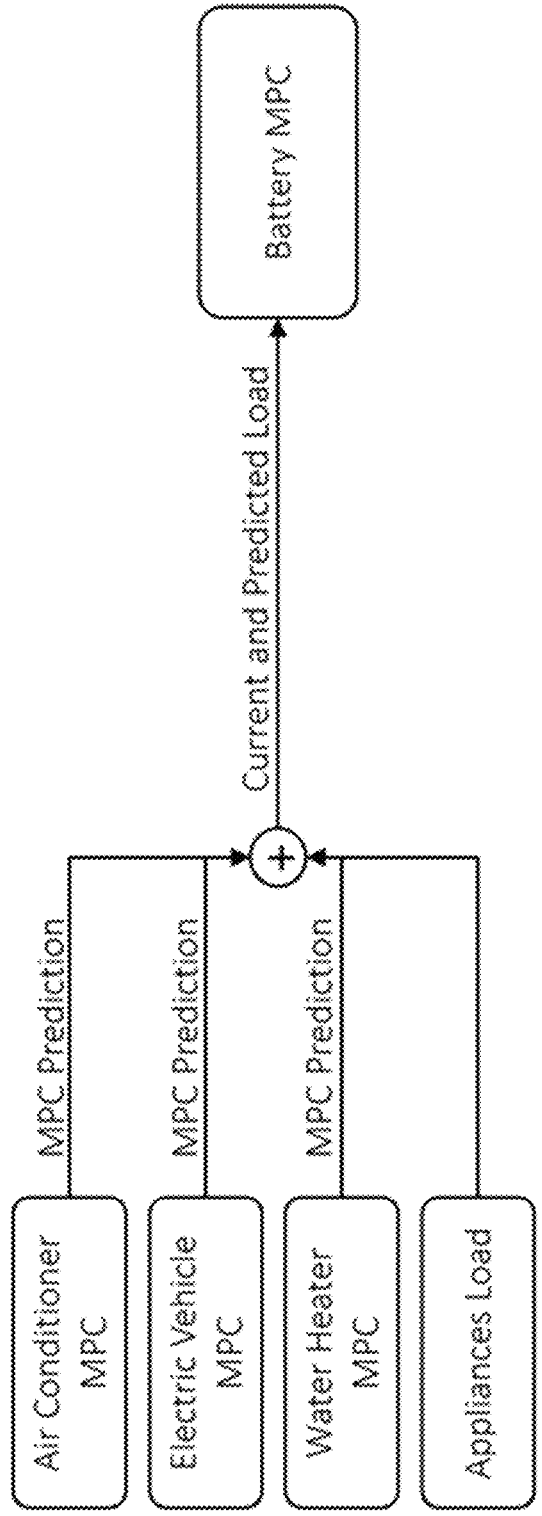
FIG. 16 illustrates a relationship of various energy devices in buildings and BESS according to various example embodiments.

This building EMS can use information from other appliances operation to produce a more efficient control action or strategy. For example, other an MPC for electrical devices can be used to build the prediction of building load and feed into the BESS MPC as shown in FIG. 16.

The MPC has been formulated to use any pricing method including time of use (TOU), dynamic real time, demand response, and hourly pricing. This EMS controller considers the efficiency of different electrical components in the system to find the most efficient control action or strategy. Equation (1) is an optimization formulation to describe this control scenario.

$$\min \sum_{t=1}^{m} p_t P_G + \omega s_t \quad (1)$$

Subject to:

$$P_G = P_L + P_R - P_t$$

$$P_{PV}\eta_{con} = P_{BI} - P_{BO} + P_I/\eta_I - \eta_R P_R$$

$$SOC^{t+1} = SOC^t + \frac{1}{Q}(\eta_C P_{BI} - 1/\eta_D P_{BO})$$

$$90 - s_t < SOC^{t+1} < 20 + s_t$$

$$P_{Gmin} \le P_G \le P_{Gmax}$$

$$0 \le P_I/P_{Imax} \le d_I$$

$$0 \le P_O/P_{Rmax} \le 1 - d_I$$

$$0 \le P_{BO}/P_{Bmax} \le d_B$$

$$0 \le P_{BI}/P_{Bmax} \le 1 - d_B$$

$$d_I, d_E \in \{0, 1\} \; P_{BI}, P_{BO}, P_I, s_t \in \mathbb{R}_{20}$$

$P_t$ Electricity price at step $i$ $P_G$ Power flow from the grid $P_L$ Power flow to the building load -continued $P_R$ Power flow to the rectifier $P_I$ Power flow from the inverter $P_{PV}$ Power flow from the photovoltaic panel $P_{BI}$ Power flow to the battery $P_{BO}$ Power flow from the battery $P_{Gmax}, P_{Gmin}$ Grid maximum and minimum power flow $P_{Bmax}$ Battery maximum power flow $P_{Rmax}$ Rectifier maximum power flow $P_{Imax}$ Inverter maximum power flow $\eta_0$ Battery charging efficiency $\eta_D$ Battery discharging efficiency $\eta_{con}$ Converter efficiency $\eta_I$ Inverter efficiency $\eta_R$ Rectifier efficiency $d_I, d_B$ Power flow direction for battery and inverter $\omega$ Penalty weight for free variable $s_i$ Free variable to relax the constraint $SOC^i$ Battery state of charge at step $i$ $Q$ Battery capacity With respect to a second example scenario (Scenario 2), an Integrated Model Predictive Control (MPC) of Battery Energy Storage System (BESS), Grid, Appliances, and Electric Vehicle (EV) can be used to optimize power cost according to various embodiments of the present disclosure. The building energy management system (EMS) can also control different electrical appliances in a centralized or integrated configuration to find an efficient control action or strategy for all the appliances in one control problem. The integrated MPC can find the efficient control action or strategy for all the appliances considering dynamic electricity price, user behavior, and appliances model. This controller can shift building power extraction from the grid while satisfying user preference and maintain user's thermal comfort. Equation (2) is an optimization formulation to describe this control scenario.

$$\min \sum_{t=1}^{m} p_t \times P_G^t \quad (2)$$

Subject to:

$$\begin{bmatrix} A_{AC} & 0 & 0 & 0 \\ 0 & A_{EV} & 0 & 0 \\ 0 & 0 & A_{WH} & 0 \\ a_1 & a_2 & a_3 & A_{Bat} \end{bmatrix} \begin{bmatrix} X_{AC} \\ X_{EV} \\ X_{WH} \\ X_{Bat} \end{bmatrix} \leq \begin{bmatrix} B_{AC} \\ B_{EV} \\ B_{WH} \\ B_{Bat} \end{bmatrix}$$

Figure 17A:
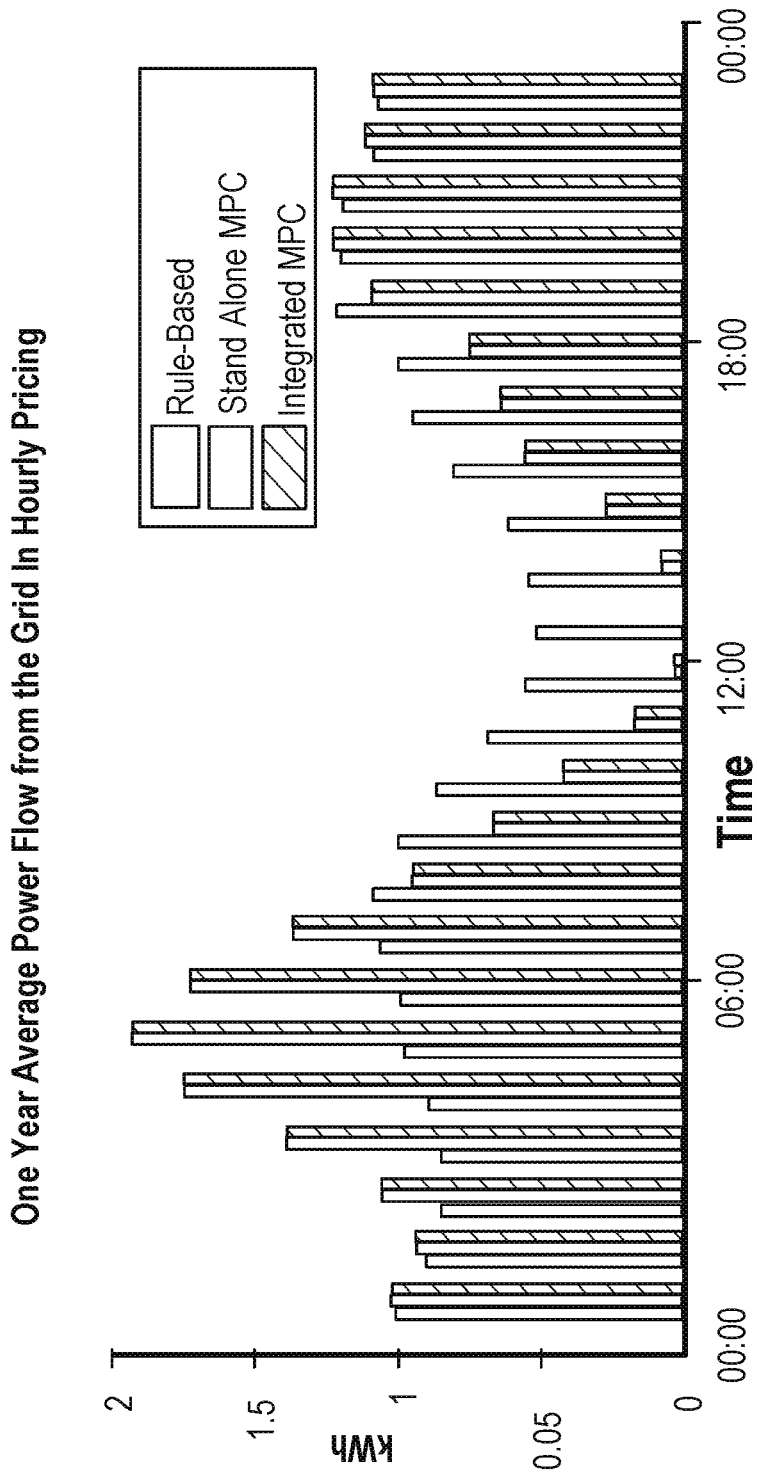
FIGS. 17A and 17B illustrate simulation results from three control strategies according to various example embodiments.
Figure 17B:
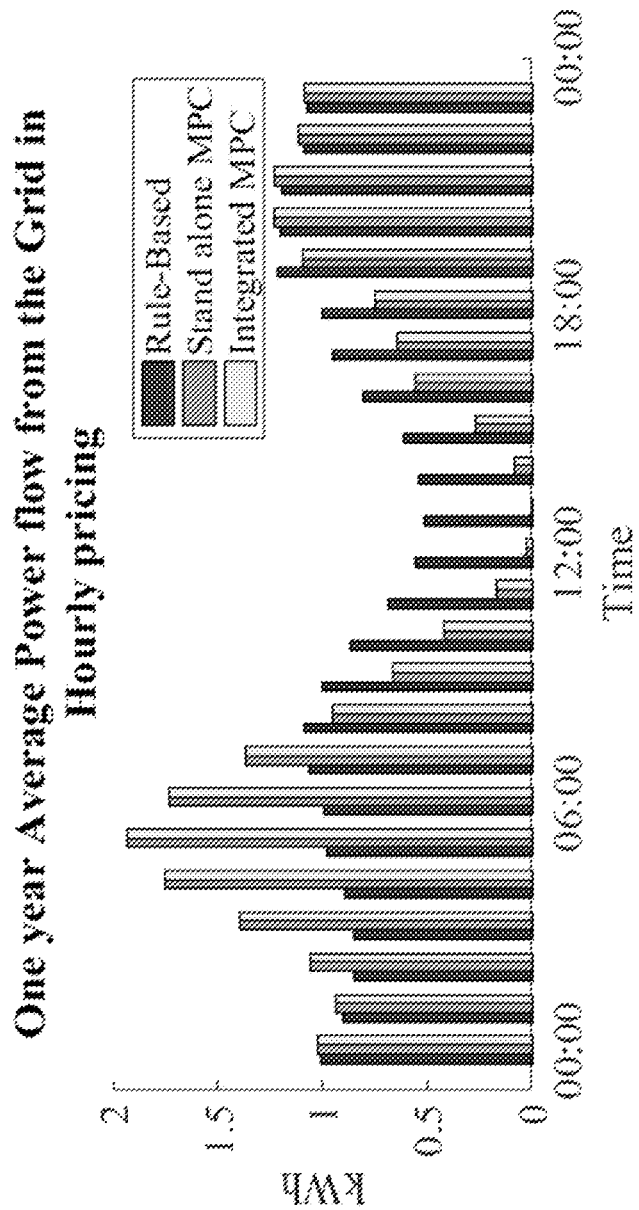

$p_t$ Electricity rate at step $i$ $P_G^t$ Power flow from the grid at step $i$ $A_{AC}, B_{AC}$ Air conditioner MPC constraint and bound matrices $A_{EV}, B_{EV}$ Electric vehicle MPC constraint and bound matrices $A_{WH}, B_{WH}$ Water heater MPC constraint and bound matrices $A_{Bat}, B_{Bat}$ Battery MPC constraint and bound matrices -continued $X_{AC}, X_{EV}, X_{WH}, X_{Bat}$ Air conditioner, electric vehicle, water heater, and battery decision variables $a_1, a_2, a_3$ Building load relation with other appliances decision variables With reference to FIGS. 17A and 17B, shown are graphs illustrating the average energy extracted from the grid for one-year simulation using the traditional method of control (rule-based), BESS standalone MPC controller (Scenario 1), and integrated MPC controller (Scenario 2).

Table 1 shows simulated energy cost savings achieved using the methods of Scenarios 1 and 2 when compared to traditional method (rule-based) in a house. In these example simulations, the controllers achieve an energy cost savings of 18.5% to 30.6% when using the BESS integrated MPC and 9% to ~19.3% when using the BESS standalone MPC at different pricing structures from grid (Table 1). The baseline in Table 1 refers the whole house energy cost based on rule-based controls.

TABLE 1

The Percentage of Energy Cost Savings for Whole House Compared with a Rule-based Control

| Pricing | BESS Integrated MPC | BESS Standalone MPC |
|---|---|---|
| TOU (Time of Use) | 30.6 | 19.3 |
| Dynamic Pricing I: 5 minutes | 30.1 | 17.9 |
| Dynamic Pricing II: 1 hour | 18.5 | 9 |

Figure 18:
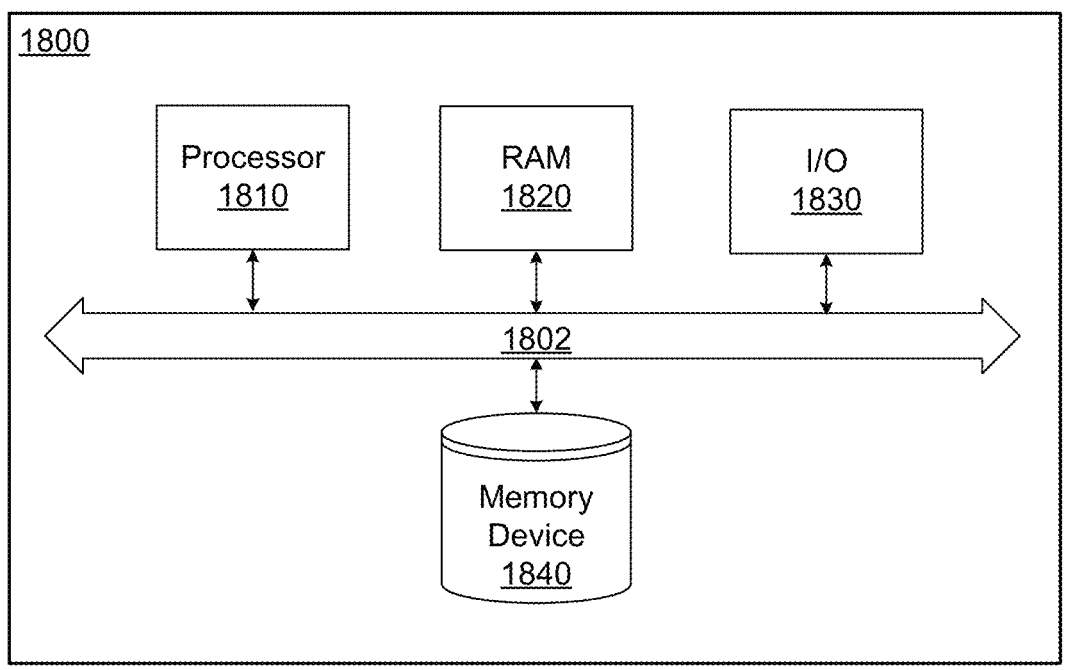
FIG. 18 is a schematic block diagram that illustrates an example computing environment according to various embodiments.

Turning to FIG. 18, an example hardware diagram of a general purpose computer 1800 is illustrated. Any of the computing devices may be implemented, in part, using one or more elements of the general purpose computer 1800. The computer 1800 includes a processor 1810, a Random Access Memory ("RAM") 1820, a Read Only Memory ("ROM") 1830, a memory device 1840, a network interface 1850, and an Input Output ("I/O") interface 1860. The elements of the computer 1800 are communicatively coupled via a bus 1802.

The processor 1810 comprises any well-known general purpose arithmetic processor or Application Specific Integrated Circuit ("ASIC"). The RAM and ROM 1820 and 1830 comprise any well-known random access or read only memory device that stores computer-readable instructions to be executed by the processor 1810. The memory device 1830 stores computer-readable instructions thereon that, when executed by the processor 1810, direct the processor 1810 to execute various aspects of the present invention described herein. When the processor 1810 comprises an ASIC, the processes described herein may be executed by the ASIC according to an embedded circuitry design of the ASIC, by firmware of the ASIC, or both an embedded circuitry design and firmware of the ASIC. As a non-limiting example group, the memory device 1830 comprises one or more of an optical disc, a magnetic disc, a semiconductor memory (i.e., a semiconductor, floating gate, or similar flash based memory), a magnetic tape memory, a removable memory, combinations thereof, or any other known memory means for storing computer-readable instructions. The network interface 1850 comprises hardware interfaces to communicate over data networks. The I/O interface 1860 comprises device input and output interfaces such as keyboard, pointing device, display, communication, and other interfaces. The bus 1802 electrically and communicatively couples the processor 1810, the RAM 1820, the ROM 1830, the memory device 1840, the network interface 1850, and the I/O interface 1860, so that data and instructions may be communicated among them.

In operation, the processor 1810 is configured to retrieve computer-readable instructions stored on the memory device 1840, the RAM 1820, the ROM 1830, or another storage means, and copy the computer-readable instructions to the RAM 1820 or the ROM 1830 for execution, for example. The processor 1810 is further configured to execute the computer-readable instructions to implement various aspects and features of the present invention. For example, the processor 1810 may be adapted and configured to execute the processes described above, including processes performed by the computing device 1800. Also, the memory device 1840 may store the data stored in the database.

A phrase, such as "at least one of X, Y, or Z," unless specifically stated otherwise, is to be understood with the context as used in general to present that an item, term, etc., can be either X, Y, or Z, or any combination thereof (e.g., X, Y, and/or Z). Similarly, "at least one of X, Y, and Z," unless specifically stated otherwise, is to be understood to present that an item, term, etc., can be either X, Y, and Z, or any combination thereof (e.g., X, Y, and/or Z). Thus, as used herein, such phrases are not generally intended to, and should not, imply that certain embodiments require at least one of either X, Y, or Z to be present, but not, for example, one X and one Y. Further, such phrases should not imply that certain embodiments require each of at least one of X, at least one of Y, and at least one of Z to be present.

Although embodiments have been described herein in detail, the descriptions are by way of example. The features of the embodiments described herein are representative and, in alternative embodiments, certain features and elements may be added or omitted. Additionally, modifications to aspects of the embodiments described herein may be made by those skilled in the art without departing from the spirit and scope of the present invention defined in the following claims, the scope of which are to be accorded the broadest interpretation so as to encompass modifications and equivalent structures.

Therefore, at least the following is claimed:

1. A system comprising:
    a data store; and
    at least one computing device in communication with the data store, the at least one computing device being configured to at least:
        obtain meter data from at least one smart meter associated with a plurality of power usage devices of a building, the meter data comprising a plurality of sets of measurements of energy usage detailing power consumption of the plurality of power usage devices, the plurality of power usage devices individually corresponding to a respective one of the plurality of sets of measurements;
        store the plurality of sets of measurements in the data store;
        generate a respective prediction of future consumption for each of the plurality of power usage devices based at least in part on the plurality of sets of measurements;
        optimize energy cost based at least in part on the respective prediction of future consumption for each of the plurality of power usage devices; and
        modify power consumption of at least one power usage device of the plurality of power usage devices, the power consumption modified by a controller of the at least one power usage device in response to the optimized energy cost determined by the at least one computing device.

2. The system of claim 1, wherein the at least one computing device is further configured to at least determine a utility pricing schema, wherein the energy cost is optimized based further in part on the utility pricing schema.

3. The system of claim 2, wherein the utility pricing schema comprises at least one of a time of use (TOU) pricing schema or a real time electricity pricing schema.

4. The system of claim 1, wherein the at least one computing device is further configured to at least predict an occupancy of a building, wherein the energy cost is optimized based further in part on the occupancy of the building.

5. The system of claim 1, wherein the at least one computing device is further configured to at least predict a quantity of energy to be generated by an onsite renewable energy generator over a time period, wherein the energy cost is optimized based further in part on the quantity of energy to be generated.

6. The system of claim 1, wherein the at least one computing device is further configured to at least determine a quantity of energy in an energy storage device, wherein the energy cost is optimized based further in part on the quantity of energy in the energy storage device.

7. The system of claim 1, wherein the at least one computing device is further configured to at least:
    determine that the respective prediction of future consumption for one of the plurality of power usage devices corresponds to a first time window; and
    determine that a second time window preceding the first time window corresponds to a lower price per unit of energy, wherein modifying the power consumption comprises storing an amount of energy corresponding to the respective prediction of future consumption for the one of the plurality of power usage devices in a battery during the second time window.

8. The system of claim 1, wherein each of the plurality of sets of measurements of energy usage comprises a plurality of energy measurements and a plurality of measurement times for the respective one of the plurality of power usage devices.

9. The system of claim 8, wherein modifying the power consumption of the at least one power usage device is based upon a corresponding control horizon.

10. The system of claim 1, wherein the at least one computing device is further configured to at least:
    predict a respective prediction of future consumption for each of the plurality of power usage devices based at least in part on a predicted occupancy; and
    predict an amount of energy storage and a quantity of energy generated in onsite renewable energy generation, wherein the respective prediction of future consumption, the amount of energy storage, and the quantity of energy generated are predicted based at least in part on model predictive control.

11. A method comprising:
receiving, via at least one computing device, meter data from at least one smart meter associated with a plurality of power usage devices of a building, the meter data comprising a plurality of sets of measurements of energy usage detailing power consumption of the plurality of power usage devices, the plurality of power usage devices individually corresponding to a respective one of the plurality of sets of measurements;
storing, via the at least one computing device, the plurality of sets of measurements in a data store;
generating, via the at least one computing device, a respective prediction of future consumption for each of the plurality of power usage devices based at least in part on the plurality of sets of measurements; and
modifying, via the at least one computing device, power consumption of at least one power usage device of the plurality of power usage devices to optimize an energy cost based at least in part on the respective prediction of future consumption for each of the plurality of power usage devices, the power consumption modified by an integrated controller of the at least one power usage device in response to the at least one computing device.

12. The method of claim 11, further comprising:
determining, via the at least one computing device, that the respective prediction of future consumption for one of the plurality of power usage devices corresponds to a first time window; and
determining, via the at least one computing device, that a second time window preceding the first time window corresponds to a lower price per unit of energy, wherein modifying the power consumption comprises storing an amount of energy corresponding to the respective prediction of future consumption for the one of the plurality of power usage devices in a battery during the second time window.

13. The method of claim 11, wherein each of the plurality of sets of measurements of energy usage includes a plurality of energy measurements and measurement times for one of the plurality of power usage devices.

14. The method of claim 11, further comprising modeling a thermal behavior of a building using a resistance capacitor network model.

15. The method of claim 11, wherein the respective prediction of future consumption for each of the plurality of power usage devices is generated using model predictive control.

16. The method of claim 11, further comprising:
determining, via the at least one computing device, a time of next use for a power usage device of the plurality of power usage devices;
calculating, via the at least one computing device, an amount of time to charge a battery corresponding to the power usage device to be fully charged; and
determining, via the at least one computing device, a charging start time based at least in part on the time of next use and the amount of time to charge the battery.

17. The method of claim 11, further comprising modeling, via the at least one computing device, a power usage for one of the plurality of power usage devices based at least in part on a linear energy balance method.

18. The method of claim 11, further comprising:
generating, via the at least one computing device, another prediction of future consumption for each of the plurality of power usage devices based at least in part on sets of measurements of energy usage detailing power consumption of the plurality of power usage devices after the power consumption modification by the integrated controller of the at least one power usage device; and
modifying, via the at least one computing device, power consumption of the at least one power usage device or another power usage device of the plurality of power usage devices to optimize the energy cost based at least in part on the other prediction.

19. The system of claim 1, wherein the at least one computing device is further configured to:
optimize the energy cost based at least in part on another prediction of future consumption for each of the plurality of power usage devices based at least in part on sets of measurements of energy usage detailing power consumption of the plurality of power usage devices after the power consumption modification by the controller of the at least one power usage device; and
modify power consumption of the at least one power usage device or another power usage device of the plurality of power usage devices.

* * * * *